US010142960B2

(12) United States Patent
Chu et al.

(10) Patent No.: US 10,142,960 B2
(45) Date of Patent: Nov. 27, 2018

(54) MULTI-USER RANGING WITH UNASSOCIATED STATIONS

(71) Applicant: Marvell World Trade Ltd., St. Michael (BB)

(72) Inventors: Liwen Chu, San Ramon, CA (US); Sagar A. Tamhane, Fremont, CA (US); Christian R. Berger, San Jose, CA (US); Niranjan Grandhe, San Jose, CA (US); Hongyuan Zhang, Fremont, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/695,928

(22) Filed: Sep. 5, 2017

(65) Prior Publication Data
US 2018/0070330 A1    Mar. 8, 2018

Related U.S. Application Data

(60) Provisional application No. 62/383,915, filed on Sep. 6, 2016.

(51) Int. Cl.
*H04W 24/00* (2009.01)
*H04W 64/00* (2009.01)
(Continued)

(52) U.S. Cl.
CPC ......... *H04W 64/003* (2013.01); *G01S 5/0205* (2013.01); *G01S 5/0226* (2013.01);
(Continued)

(58) Field of Classification Search
CPC .............. H04W 64/003; H04W 84/12; H04W 72/0413; H04W 72/0453; H04W 72/121;
(Continued)

(56) References Cited

U.S. PATENT DOCUMENTS

2013/0128808 A1   5/2013   Wentink et al.
2016/0029373 A1   1/2016   Seok
(Continued)

FOREIGN PATENT DOCUMENTS

EP    3068183    9/2016
EP    3185452    6/2017
(Continued)

OTHER PUBLICATIONS

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).
(Continued)

*Primary Examiner* — Barry W Taylor

(57) ABSTRACT

A first communication i) selects one or more respective preliminary identifiers (IDs) for one or more second communication devices, or ii) receives one or more respective preliminary IDs from one or more second communication devices, the one or more respective preliminary IDs having been respectively selected by the one or more second communication devices. The first communication device generates a trigger frame, the trigger frame indicating one or more first frequency resource and/or spatial stream allocations to one or more second communication devices using the one or more respective preliminary IDs. The first communication device transmits the trigger frame to initiate at least an uplink (UL) MU transmission by multiple second communication devices for a ranging procedure.

12 Claims, 8 Drawing Sheets

(51) Int. Cl.
| | |
|---|---|
| *G01S 19/05* | (2010.01) |
| *G01S 5/14* | (2006.01) |
| *H04W 84/12* | (2009.01) |
| *G01S 5/02* | (2010.01) |
| *H04B 7/0417* | (2017.01) |
| *H04B 7/0452* | (2017.01) |
| *H04W 72/04* | (2009.01) |
| *H04W 72/06* | (2009.01) |
| *H04W 72/10* | (2009.01) |
| *H04W 74/00* | (2009.01) |
| *G01S 19/48* | (2010.01) |
| *G01S 5/12* | (2006.01) |
| *G01S 19/25* | (2010.01) |
| *H04B 7/02* | (2018.01) |
| *H04L 5/00* | (2006.01) |
| *H04W 72/12* | (2009.01) |
| *H04W 88/08* | (2009.01) |

(52) U.S. Cl.
CPC .......... *G01S 5/0284* (2013.01); *G01S 5/0289* (2013.01); *G01S 5/14* (2013.01); *G01S 19/05* (2013.01); *H04B 7/0417* (2013.01); *H04B 7/0452* (2013.01); *H04W 72/04* (2013.01); *H04W 72/042* (2013.01); *H04W 72/0406* (2013.01); *H04W 72/046* (2013.01); *H04W 72/0453* (2013.01); *H04W 72/06* (2013.01); *H04W 72/10* (2013.01); *H04W 74/002* (2013.01); *H04W 84/12* (2013.01); *G01S 5/12* (2013.01); *G01S 19/252* (2013.01); *G01S 19/48* (2013.01); *H04B 7/02* (2013.01); *H04L 5/0007* (2013.01); *H04W 72/121* (2013.01); *H04W 88/08* (2013.01)

(58) Field of Classification Search
CPC . G01S 19/05; G01S 19/48; G01S 5/12; G01S 5/14; G01S 19/252; H04L 5/0055
See application file for complete search history.

(56) References Cited

U.S. PATENT DOCUMENTS

2016/0081054 A1   3/2016   Zhang et al.
2016/0323879 A1   11/2016  Ghosh et al.
2017/0127404 A1*  5/2017   Merlin .............. H04W 72/0413
2017/0202026 A1*  7/2017   Ahn .................. H04W 74/0833
2018/0027561 A1*  1/2018   Segev ............... H04W 72/0453

FOREIGN PATENT DOCUMENTS

| WO | WO-2015/068968 | 5/2015 |
| WO | WO-2015/199518 | 12/2015 |

OTHER PUBLICATIONS

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE Std 802.11-REVmc™/D8.0, Aug. 2016, "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. i-civ, 291-294, 336-341, 387-389, 771-773, 819-821, 858-865, 901-903, 1062-1066, 11581161, 1552-1571, 1703-1707, 1740, 1741, 1765-1775, 2193, 2194, 3601, 3602 (Aug. 2016).

Zhu et al., "IEEE P802.11, Wireless LANs, Proposed 802.11az Functional Requirements," Institute of Electrical and Electronics Engineers, doc. IEEE 802.11-16/0424r4, 6 pages (Mar. 13, 2017).

International Search Report and Written Opinion in International Patent Application No. PCT/US2017/050115, dated Nov. 20, 2017 (15 pages).

* cited by examiner

MULTI-USER RANGING WITH UNASSOCIATED STATIONS

CROSS REFERENCES TO RELATED APPLICATIONS

This application claims the benefit of U.S. Provisional Patent Application No. 62/383,915, entitled "MU Ranging within One TXOP," filed on Sep. 6, 2016, the disclosure of which is hereby expressly incorporated herein by reference in its entirety.

FIELD OF TECHNOLOGY

The present disclosure relates generally to wireless communication systems, and more particularly to communication devices exchanging transmissions for the purpose of measuring a distance between the communication devices.

BACKGROUND

Wireless local area networks (WLANs) have evolved rapidly over the past decade, and development of WLAN standards such as the Institute for Electrical and. Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some mobile communication devices include a WLAN network interface and satellite positioning technology, such as global positioning system (GPS) technology. GPS technology in mobile communication devices is useful for navigating to a desired location, for example. However, GPS technology does not typically provide accurate location information when a GPS receiver is not in direct sight of a GPS satellite, and thus GPS technology is often not useful for providing location information while a mobile communication device is within a building such as an airport, a shopping mall, etc., within a tunnel, etc.

Techniques for determining a position of a communication device using WLAN technology are now under development. For example, a distance between a first communication and a second communication device is determined by measuring a time of flight of WLAN transmissions between the first communication device and the second communication device, and the determined distance. Similarly, distances between the first communication device and multiple third communication devices are determined. Then, the determined distances are used to estimate a location of the first communication device by employing, for example, a triangulation technique.

SUMMARY

In an embodiment, a method is associated with multi-user (MU) communications in a wireless communication network, the MU communications between a first communication device that manages the wireless communication network and a plurality of second communication devices, wherein a first set of one or more second communication devices is not associated with the wireless communication network and has not been assigned association identifiers (IDs) by the first communication device, and wherein a second set of one or more second communication devices is associated with the wireless communication network and has been assigned association IDs by the first communication device. The method includes: one of i) selecting, at the first communication device, one or more respective preliminary IDs for one or more second communication devices in the first set, or ii) receiving, at the first communication device, one or more respective preliminary IDs from one or more second communication devices in the first set, the one or more respective preliminary IDs having been respectively selected by the one or more second communication devices in the first set; generating, at the first communication device, a trigger frame, the trigger frame including one or more respective first fields respectively indicating one or more first frequency resource and/or spatial stream allocations to one or more second communication devices in the first set, the one or more respective first frequency resource and/or spatial stream allocations respectively indicated by the one or more respective preliminary IDs; and transmitting, with the communication device, the trigger frame to initiate at least an uplink (UL) MU transmission by multiple second communication devices according to the one or more first frequency resource and/or spatial stream allocations in the trigger frame.

In another embodiment, an apparatus is for use in a wireless communication network that includes a first communication device that manages the wireless communication network and a plurality of second communication devices, wherein a first set of one or more second communication devices is not associated with the wireless communication network and has not been assigned association identifiers (IDs) by the first communication device, and wherein a second set of one or more second communication devices is associated with the wireless communication network and has been assigned association IDs by the first communication device. The apparatus comprises a network interface device associated with the first communication device. The network interface device includes one or more integrated circuits (ICs) configured to: one of i) select one or more respective preliminary IDs for one or more second communication devices in the first set, or ii) receive one or more respective preliminary IDs from one or more second communication devices in the first set, the one or more respective preliminary IDs having been respectively selected by the one or more second communication devices in the first set; generate a trigger frame, the trigger frame including one or more respective first fields respectively indicating one or more first frequency resource and/or spatial stream allocations to one or more second communication devices in the first set, the one or more respective first frequency resource and/or spatial stream allocations respectively indicated by the one or more respective preliminary IDs; and generate a PHY data unit for transmission via one or more antennas of the communication device, the PHY data unit including the trigger frame, wherein transmission of the trigger frame initiates at least an uplink (UL) multi user (MU) transmission by multiple second communication devices according to the one or more first frequency resource and/or spatial stream allocations in the trigger frame.

DETAILED DESCRIPTION

It is sometimes useful for a client station to perform a ranging exchange with an access point (AP) with which the client station is not associated. Some APs may need to perform ranging exchanges with relatively large numbers of client stations. Thus, APs may use multi-user (MU) techniques, e.g., orthogonal frequency division multiple access (OFDMA) and/or MU multiple input, multiple output (MU-MIMO), during ranging exchanges to decrease the duration of ranging exchanges with multiple client stations. An AP informs client stations of resource unit (RU) and/or spatial stream allocations for MU transmissions by referring to association identifiers (AIDS) of the client stations that the AP assigned to the client stations when the client stations became associated with the AP. But a client station that is not associated with the AP has not been assigned an AID by the AP, and thus the AP cannot refer to an AID for the purpose of allocating an RU to the unassociated station.

In embodiments described below, an AP or an unassociated client station selects a preliminary identifier (ID), and then the AP uses the preliminary ID to inform the unassociated client station of an RU or spatial stream(s) to be used for an MU transmission during a ranging exchange.

Ranging exchange techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, ranging exchange techniques are utilized in other types of wireless communication systems such as personal area networks (PANs), mobile communication networks such as cellular networks, metropolitan area networks (MANs), etc.

Figure 1:
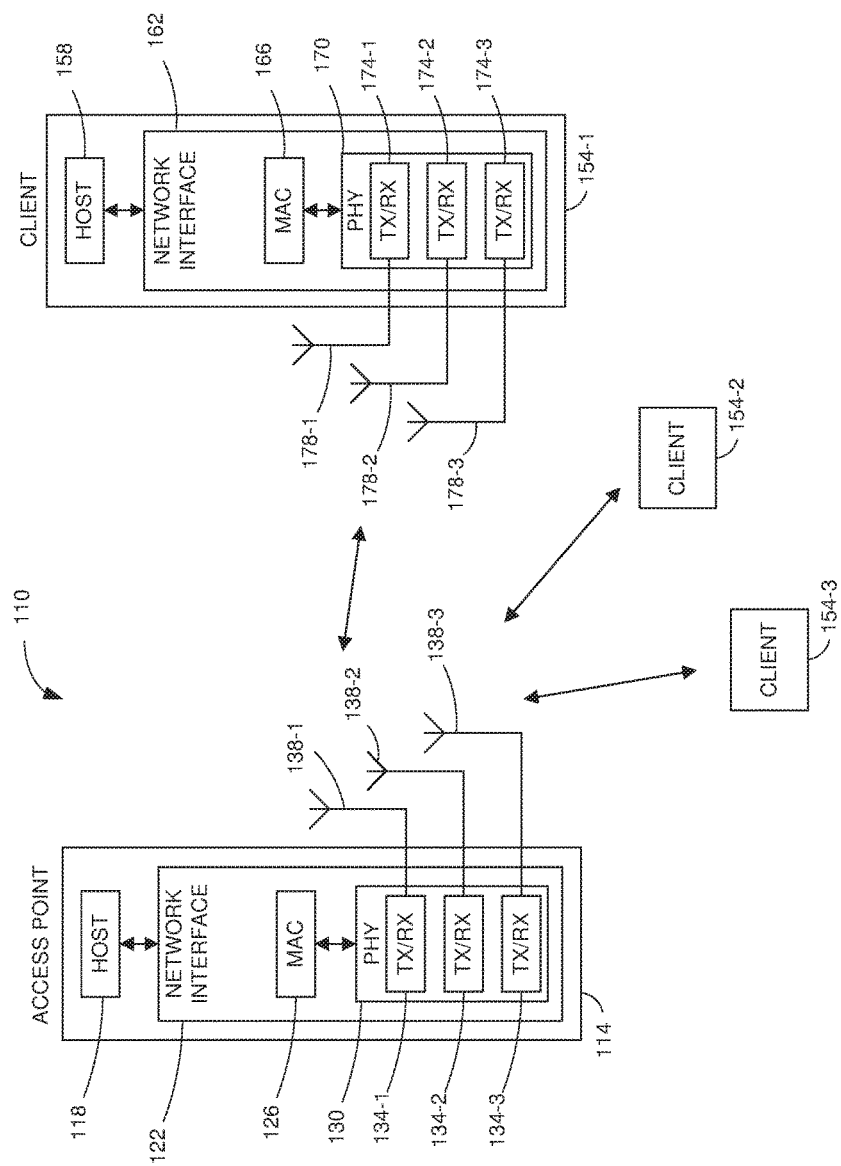
FIG. 1 is a block diagram of an example wireless local area network (WLAN) in which a multi-user (MU) ranging procedure is performed to estimate distances between communication devices in the WLAN, according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e,g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 171 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2A:
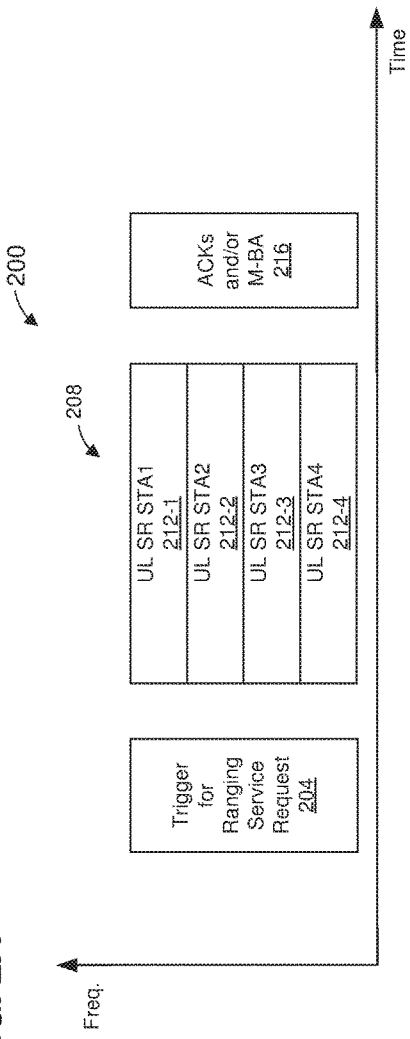
FIG. 2A is a timing diagram of an example transmission exchange during a first stage of the MU ranging procedure, according to an embodiment.

FIG. 2A is a timing diagram of an example multi-user (MU) ranging setup exchange in a first stage of MU ranging procedure, according to an embodiment. The first stage of the ranging procedure illustrated in FIG. 2A is sometimes referred to as a MU ranging service negotiation stage. FIG. 2A is described in the context of the example network 110 merely for explanatory purposes. In some embodiments, signals illustrated in FIG. 2A are generated by other suitable communication devices in other suitable types of wireless networks.

A first communication device (e.g., the AP 114) transmits a trigger frame 204 to prompt multiple second communication devices (e.g., client stations 154) to simultaneously transmit, as part of an uplink (UL) OFDMA transmission 208, UL ranging service request frames (UL SRs) 212. In an embodiment, the trigger frame 304 is a type of trigger frame specifically for prompting UL OFDMA transmissions that include ranging service request frames, and such a trigger frame is sometimes referred to herein as a TFR frame.

As used herein, the term "frame" refers to a MAC data unit. As discussed above, MAC data units are encapsulated within PHY data units prior to transmission. Thus, the "frames" illustrated in FIG. 2A are encapsulated in PHY data units (e.g., PPDUs) when transmitted.

The trigger frame 204 prompts multiple client stations 154 to begin simultaneously transmitting the UL MU transmission 208 a defined time period after an end of the trigger frame 204 downlink (DL) transmission. In an embodiment, the defined time period is the short interframe space (SIFS) defined by the IEEE 802.11 Standard. In other embodiments, another suitable tune period is utilized.

As discussed above, the UL OFDMA transmission 208 includes UL SRs 212 from multiple client stations 154, e.g., STA1, STA2, STA3, and STA4. In an embodiment, client stations 154 contend for frequency resource units (RUs) to be used in the UL OFDMA transmission 208, as opposed to the RUs being assigned to particular client stations 154 by the AP 114. At least some of the client stations 154 participating in the UL OFDMA transmission 208 are not associated with the AP 114 and thus the AP 114 has not yet assigned association identifiers (AIDs) to the at least some client stations 154.

The UL SRs 212 are illustrated in FIG. 2A as being transmitted in different frequency bandwidth portions corresponding to different frequency RUs.

Each UL SRs 212 indicates to the AP 114 that the corresponding client station 154 requests to participate in a MU ranging transmission exchange. One or more of the UL SRs 312 include information regarding respective capabilities, related to ranging transmissions, of one or more client stations 154, according to an embodiment. For example, an UL SR 212 includes information that indicates bandwidth capabilities of the client station 154. As another example, the UL SR 212 includes information that indicates one or more types of ranging transmission exchanges in which the client station 154 is capable of participating. As yet another example, the UL SR 212 includes a number of long training fields (LTFs) (e.g., a number of high efficiency-LTFs (HE-LTFs) and/or a number of very high throughput-LTFs (VHT-LTFs) in a PHY preamble that the STA supports for MU ranging.

Responsive to the UL OFDMA transmission 208, the AP 114 begins transmitting an acknowledgment transmission 216 a defined time period after an end of the UL OFDMA transmission 208. In an embodiment, the defined time period is SIFS. In other embodiments, another suitable time period is utilized.

In some embodiments, the acknowledgment transmission 216 includes one or more acknowledgment (ACK) frames and/or a multi-station block acknowledgement (M-BA) frame. For example, in an embodiment, the acknowledgment transmission 216 includes an ACK frame that acknowledges one of the UL SRs 212 and that is transmitted within a same frequency bandwidth portion as the one UL SR 212. As another example, in an embodiment, the acknowledgment transmission 216 includes an M-BA frame that acknowledges multiple UL SRs 212 and that is transmitted across a same set of frequency bandwidth portions as the multiple UL SRs 212.

Using the UL OFDMA transmission 208 (and, optionally, other UL OFDMA transmissions (not shown in FIG. 2A) similar to the UL OFDMA transmission 308), the AP 114 determines a group of client stations 154 to participate in an MU ranging signal exchange in a second stage of the MU ranging procedure. The second stage of the ranging procedure is sometimes referred to as a MU ranging stage. The AP 114 selects client stations 154 for the group, for example, based on ranging transmission capabilities reported by client stations 154 in the UL SRs 212, according to an embodiment. For example, the AP 114 may select client stations 154 with at least some of the same ranging transmission capabilities for the group. As another example, the AP 114 may select client stations 154 with the compatible ranging transmission capabilities for the group.

Figure 2B:
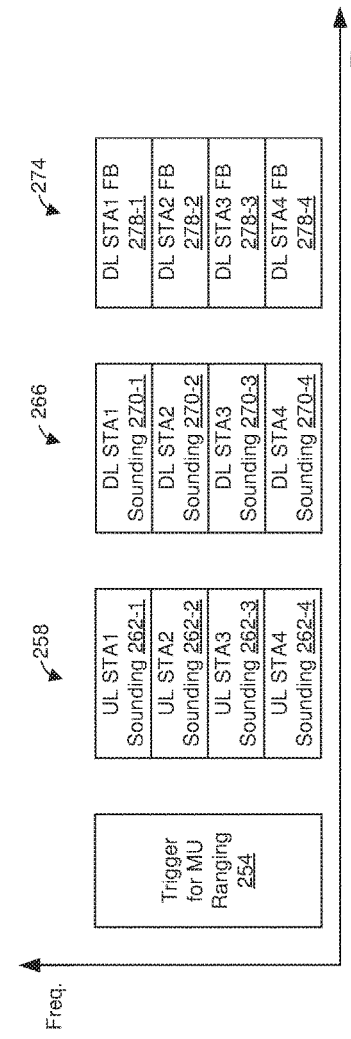
FIG. 2B is a timing diagram of an example transmission exchange during a second stage of the MU ranging procedure, according to an embodiment.

FIG. 2B is a timing diagram of an example MU ranging measurement exchange 250 in the second stage of the MU ranging procedure, according to an embodiment. The diagram 250 is described in the context of the example network 110 merely for explanatory purposes. In some embodiments, signals illustrated in FIG. 2B are generated by other suitable communication devices in other suitable types of wireless networks.

The first communication device (e.g., the AP 114) transmits a trigger frame 254 to prompt a group of multiple second communication devices (e.g., client stations 154) to simultaneously transmit, as part of an UL MU transmission 258, UL sounding PPDUs 262, e.g., UL null data packets (NDPs). For example, the group of client stations 154 may have been selected by the AP 114 as discussed above. In another embodiment, an UL MU transmission is used for client stations to simultaneously transmit UL sounding PPDUs 262, e.g. UL NDPs. In an embodiment, the trigger frame 254 is a type of trigger frame specifically for initiating an MU ranging measurement exchange such as the MU ranging measurement exchange 250.

The trigger frame 254 includes indications of assignments of frequency RUs to client stations 154, the assigned RUs to be used in subsequent MU transmissions in the MU ranging measurement exchange 250. In another embodiment, the trigger frame 254 includes indications of assignments of spatial streams (e.g., which correspond to particular HE LTFs in a PHY preamble of an UL MU PPDU) to client stations 154, the assigned spatial streams to be used in subsequent MU transmissions in the MU ranging measurement exchange 250. For associated client stations 154, the assigned RUs or spatial streams are indicated using AIDS of the associated client stations. For unassociated client stations 154, the assigned RUs or spatial streams are indicated using preliminary IDs corresponding to the unassociated client stations. As will be described below in more detail, the AP 114 selects a preliminary ID for an unassociated client station 154 and then informs the client station 154 of the selected preliminary ID, according to an embodiment. In another embodiment, an unassociated client station 154 selects a preliminary ID and then informs the AP 114 of the selected preliminary ID.

The trigger frame 254 prompts multiple client stations 154 to begin simultaneously transmitting the UL MU transmission 258 a defined time period after an end of the trigger frame 254 DL transmission. In an embodiment, the defined time period is SIFS. In other embodiments, another suitable time period is utilized.

The UL MU transmission 258 (which may be an UL OFDMA transmission or an UL MU-MIMO transmission) includes UL sounding packets 262 from multiple client stations 154, e.g., STA1, STA2, STA3, and STA4. The frequency RU or spatial stream(s) to be used in the UL OFDMA transmission 258 by each client station 154 is indicated by information included in the trigger frame 254, as discussed above, according to an embodiment. The UL sounding packets 262 are illustrated in FIG. 2B as being transmitted in different frequency bandwidth portions corresponding to different frequency RUs. In another embodiment, the UL sounding packets 262 are transmitted using different spatial streams.

When transmitting the UL sounding packets 262, each client station 154 records a time $t_{1,k}$ at which the client station 154 began transmitting the UL sounding packet 262, where k is an index indicating the particular client station 154. Similarly, when the AP 114 receives each UL sounding packet 262, the AP 114 records a time $t_{2,k}$ at which the AP 114 began receiving the UL sounding packet 262.

Responsive to the UL MU transmission 258, the AP 114 begins transmitting a DL MU transmission 266 a defined time period after an end of the UL MU transmission 258. In an embodiment, the defined time period is SIFS. In other embodiments, another suitable time period is utilized.

The DL MU transmission 266 includes DL sounding packets 270 to respective client stations 154. In another embodiment, the AP 114 uses a SU DL transmission (with a broadcast address) to the client stations 154. The frequency RU (or spatial stream(s)) to be used in the DL MU transmission 266 for each client station 154 is the same RU (or spatial stream(s)) used by the corresponding client station 154 in the UL MU transmission 258, according to an embodiment. The DL sounding packets 270 are illustrated in FIG. 2B as being transmitted in different frequency bandwidth portions corresponding to different frequency RUs. In some embodiments, the DL sounding packets 270 are transmitted using different spatial streams (e.g., MU-MIMO).

When transmitting the DL sounding packets 266, the AP records a time $t_{3,k}$ at which the AP 114 began transmitting the DL sounding packet 270. Similarly, when each client station 154 receives the corresponding DL sounding packet 266, the client station 154 records a time $t_{4,k}$ at which the client station 154 began receiving the DL sounding packet 270.

After the DL MU transmission 266, the AP 114 begins transmitting a DL MU transmission 274 a defined time period after an end of the DL MU transmission 266. In an embodiment, the defined time period is SIFS. In other embodiments, another suitable time period is utilized.

The DL MU transmission 274 includes DL feedback packets 278 to respective client stations 154. The frequency RU or spatial stream(s) used in the DL MU transmission 278 for each client station 154 is the same RU/spatial stream(s) used by the corresponding client station 154 in the UL MU transmission 258, according to an embodiment. The DL feedback packets 278 are illustrated in FIG. 2B as being transmitted in different frequency bandwidth portions corresponding to different frequency RUs. In some embodiments, the DL feedback packets 278 are transmitted using different spatial streams (e.g., MU-MIMO).

The DL feedback packets 278 respectively include the recorded times $t_{2,k}$ and $t_{3,k}$. In some embodiments, the DL feedback packets 278 include respective channel estimate information determined by the AP 114 based on reception of the UL sounding packets 262.

After receipt of the DL feedback packets 278, the client stations 154 calculate respective of times-of-flight between the AP 114 and the client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In an embodiment, the MU ranging measurement exchange 250 occurs within a single transmit opportunity period (TXOP). If the AP 114 then initiates another MU ranging measurement exchange with another group of client stations 154, the other MU ranging measurement exchange occurs within the same TXOP, according to an embodiment. In another embodiment, if the AP 114 then initiates another MU ranging measurement exchange with another group of client stations 154, the other MU ranging measurement exchange occurs within another TXOP.

As discussed above, in some embodiments, the AP 114 selects one or more preliminary IDs for one or more unassociated client station 154 and then informs the one or more client stations 154 of the selected preliminary ID(s). In an embodiment, the AP 114 includes information in the trigger frame 254 that indicates one or more preliminary IDs assigned to one or more unassociated client station 154.

Figure 3:
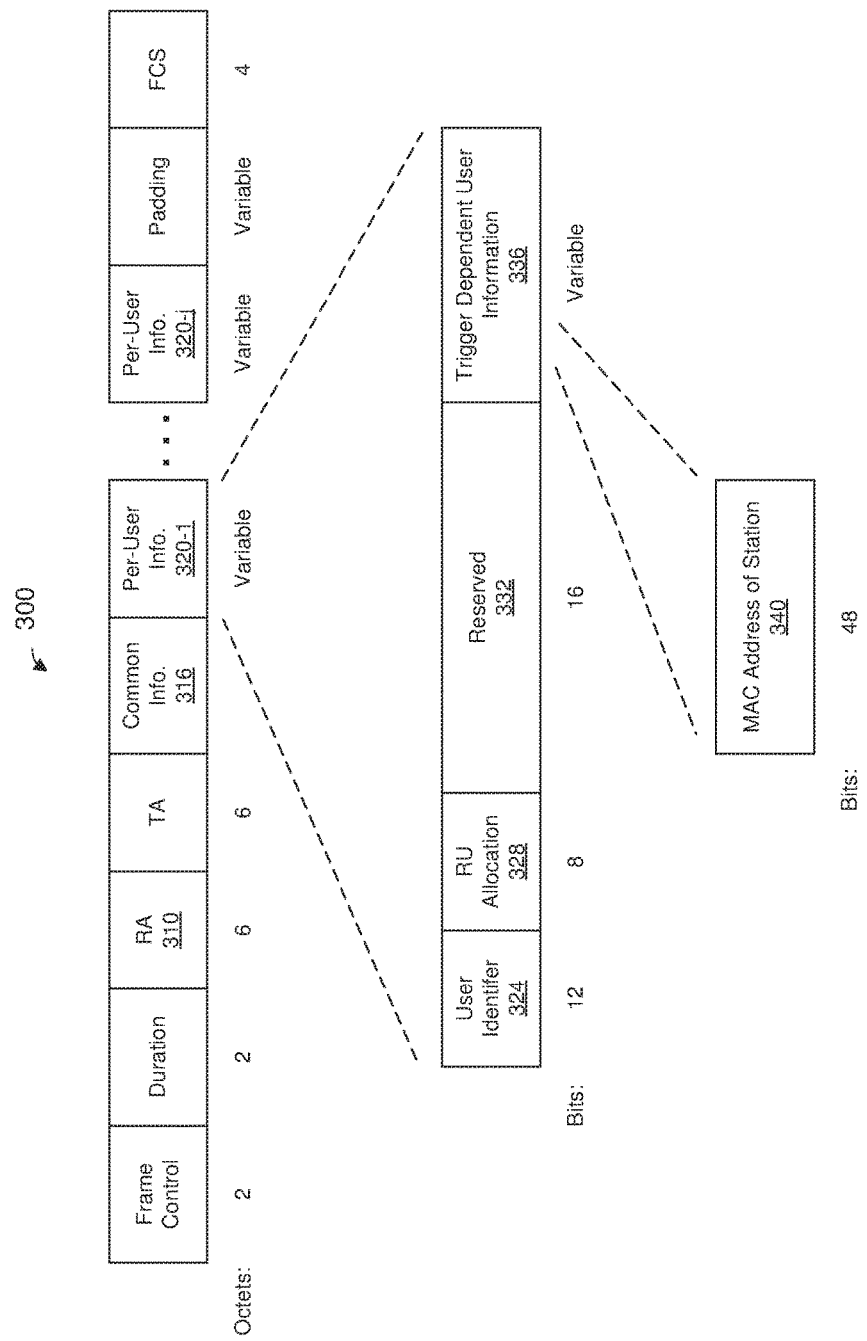
FIG. 3 is a block diagram of an example trigger frame used in an MU ranging procedure to prompt an MU transmission by multiple communication devices, according to an embodiment.

FIG. 3 is a diagram of an example trigger frame 300 that is utilized as the trigger frame 254 of FIG. 2B, according to an embodiment. In an embodiment, the MAC processor 126 (FIG. 1) generates the trigger frame 300 and provides the trigger frame to the PHY processor 130, which then generates a PHY data unit for transmission to a group of client stations 154. In other embodiments, another suitable communication device generates the trigger frame 300.

FIG. 3 includes example numbers of octets and bits of various fields of the trigger frame 300. In other embodiments, different suitable numbers of octets and bits are utilized. In other embodiments, one or more of the fields illustrated in FIG. 3 are omitted, and/or one or more additional fields are included.

The trigger frame 300 includes a receiver address (RA) field 310 that includes an address of an intended recipient(s) of the trigger frame 300. In an embodiment, the AP 114 sets the RA field 310 to a broadcast address that indicates all client stations 154 are intended recipients. In another embodiment, the AP 114 sets the RA field 310 to another suitable address so that at least the group of client stations 154 that is to participate in the MU ranging measurement exchange process the trigger frame 300.

The trigger frame 300 also includes a common information field 316. In an embodiment, the common information field 316 includes common information for the MU ranging exchange for all of the client stations 154 that are to participate. In an embodiment, the common information field 316 includes a subfield for indicating whether the MU ranging exchange is only for unassociated client stations. In an embodiment, the common information field 316 includes a subfield for indicating whether the MU ranging exchange is for a group of client stations that includes unassociated client stations. In another embodiment, the common information field 316 does not include a subfield for indicating whether the MU ranging exchange is for unassociated client stations.

The trigger frame 300 includes one or more per-user information fields 320. In an embodiment, the trigger frame 300 includes a per-user information field 320 for each client station 154 in the group of client stations 154 that is to participate in an MU ranging measurement exchange such as the MU ranging measurement exchange 250 (FIG. 2B).

The per-user information field 320 includes a user identifier field 324. If the per-user information field 320 corresponds to an associated client station 154, the user identifier field 324 includes an AID of the client station 154. On the other hand, if the per-user information field 320 corresponds to an unassociated client station 154, the user identifier field 324 includes a preliminary ID of the client station 154, where the preliminary ID was selected by the AP 114 (e.g., the MAC processor 126) for the client station 154.

The per-user information field 320 also includes an RU allocation field 328, which indicates which one or more RUs correspond to the client station 154 during the MU ranging measurement exchange (e.g., during MU transmissions 258, 266, and 274 (FIG. 2B)).

The per-user information field 320 also includes reserved bits 332. In some embodiments, the reserved bits 332 are omitted.

The per-user information field 320 also includes a user information field 336. In some embodiments and at least for unassociated client stations 154, the user information field 336 includes a field 340 having an identifier already known to the client station 154, such as a MAC address corresponding to the client station 154. Upon receiving the trigger frame 300, a client station 154 (e.g., the MAC processor 166) examines fields 340 in the per-user information fields 320 to search for the identifier of the client station 154 (e.g., the MAC address corresponding to the client station 154). When the client station 154 (e.g., the MAC processor 166) finds a per-user information field 320 with the field set to the identifier of the client station 154 (e.g., the MAC address corresponding to the client station 154), the client station 154 (e.g., the MAC processor 166) then examines the user identifier field 324 to determine the preliminary ID assigned to the client station 154. Additionally, the client station 154 (e.g., the MAC processor 166) examines the RU allocation field 328 to determine one or more RUs that correspond to the client station 154 for the MU ranging measurement exchange (e.g., during MU transmissions 258, 266, and 274 (FIG. 2B)). If UL MU MIMO is used for client stations to transmit UL NDP frames, spatial stream allocation fields are used to for client stations to decide the UL NDP transmissions. In an embodiment, MAC Address in field 340 is used by an unassociated STA to figure out a preliminary ID, RU and/or spatial stream allocated to the unassociated STA.

Referring again to FIG. 2A, in some embodiments in which the AP 114 selects one or more preliminary IDs for one or more unassociated client station 154, the AP 114 includes information in the acknowledgment transmission 216 that indicates one or more preliminary IDs assigned to one or more unassociated client stations 154. In such embodiments, the trigger frame 254 (FIG. 2B) need not include information that indicates one or more preliminary IDs assigned to one or more unassociated client station 154. Thus, for example, in some embodiments in which the AP 114 includes information in the acknowledgment transmission 216 that indicates one or more preliminary IDs assigned to one or more unassociated client station 154, the trigger frame 300 (FIG. 3) may omit fields 340 in the per-user information fields 320.

Figure 4:
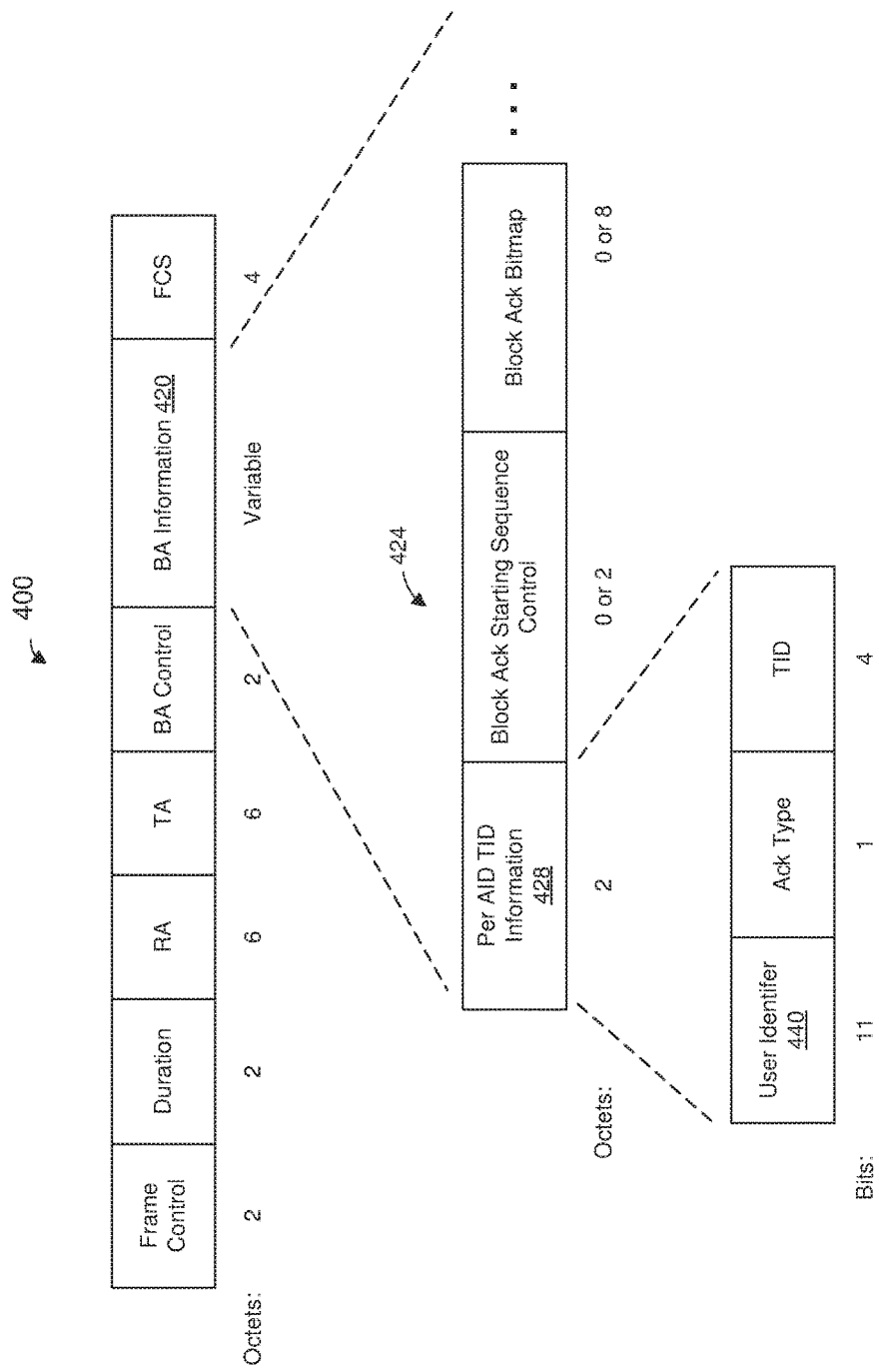
FIG. 4 is a block diagram of an example multi-user block acknowledgement (M-BA) frame that may be used in an MU ranging procedure, according to an embodiment.

FIG. 4 is a diagram of an example M-BA frame 400 that is included in the acknowledgment transmission 216, according to an embodiment. As will be described in more detail below, the AP 114 includes information in the M-BA frame 400 that indicates one or more preliminary IDs assigned to one or more unassociated client stations 154. In an embodiment, the MAC processor 126 (FIG. 1) generates the M-BA frame 400 and provides the M-BA frame 400 to the PHY processor 130, which then generates a PHY data unit for transmission to a group of client stations 15.4. In other embodiments, another suitable communication device generates the M-BA frame 400.

FIG. 4 includes example numbers of octets and bits of various fields of the M-BA frame 400. In other embodiments, different suitable numbers of octets and bits are utilized. In other embodiments, one or more of the fields illustrated in FIG. 4 are omitted, and/or one or more additional fields are included.

The trigger frame 400 includes a block acknowledgement (BA) field 420, which includes a plurality of fields 424. Each field 424 corresponds to one of the RUs in the UL OFDMA transmission 208 of FIG. 2A, and the plurality of fields 424 are arranged in an order corresponding to an order of RUs in the UL OFDMA transmission 208. Thus, each field 424 corresponds to one of the client stations 154 participating in the UL OFDMA transmission 208.

Each field 424 includes a field 428 (e.g., a per user, per traffic identifier (TID) field) that includes acknowledgment information for a particular client station. Each field 424 also includes a user identifier field 440. If the field 424 corresponds to an associated client station 154, the user identifier field 440 includes an AID of the client station 154. On the other hand, if the field 424 corresponds to an unassociated client station 154, the user identifier field 440 includes a preliminary ID of the client station 154, where the preliminary ID was selected by the AP 114 (e.g., the MAC processor 126) for the client station 154.

Referring now to FIGS. 2A and 4, upon receiving the M-BA frame 400 (transmitted by the AP 114 responsive to the UL OFDMA transmission 208), a client station 154 (e.g., the MAC processor 166) selects a field 424 in the M-BA frame 400 according to i) the frequency RU used by the client station 154 to transmit the UL SR 212 and ii) the order of the fields 424. The client station 154 (e.g., the MAC processor 166) then examines the user identifier field 440 to determine the preliminary ID assigned to the client station 154. Referring again to FIGS. 2B and 3, upon receiving the trigger frame 254/300, the client station 154 (e.g., the MAC processor 166) examines fields 324 in the per-user information fields 320 to search for the preliminary ID of the client station 154. When the client station 154 (e.g., the MAC processor 166) finds a per-user information field 320 with the field 324 set to the preliminary ID of the client station 154, the client station 154 (e.g., the MAC processor 166) examines the RU allocation field 328 to determine one or more RUs that correspond to the client station 154 for the MU ranging measurement exchange (e.g., during MU transmissions 258, 266, and 274 (FIG. 2B)).

Referring now to FIGS. 2A and 4, if the AP 114 does not receive an UL SR 212, or cannot decode a received UL SR 212, corresponding to one of the RUs, the AP 114 still generates a field 424 corresponding to the one RU and includes the field 424 in the BA information field 420 to preserve the order of the fields 424 and so that each field 424 corresponds to one of the RUs in the UL OFDMA transmission 208, according to an embodiment. The AP 114 (e.g., the MAC processor 126) includes information in the field 424 corresponding to the one RU that indicates a negative ACK (NACK). Additionally, the AP 114 (e.g., the MAC processor 126) does not assign a preliminary ID and does not include an assigned preliminary ID in the user identifier field 440, according to some embodiments. For example, the user identifier field 440 is omitted from the field 424 or the user identifier field 440 is set to a predetermined value associated, for example, with unknown client stations.

Figure 5:
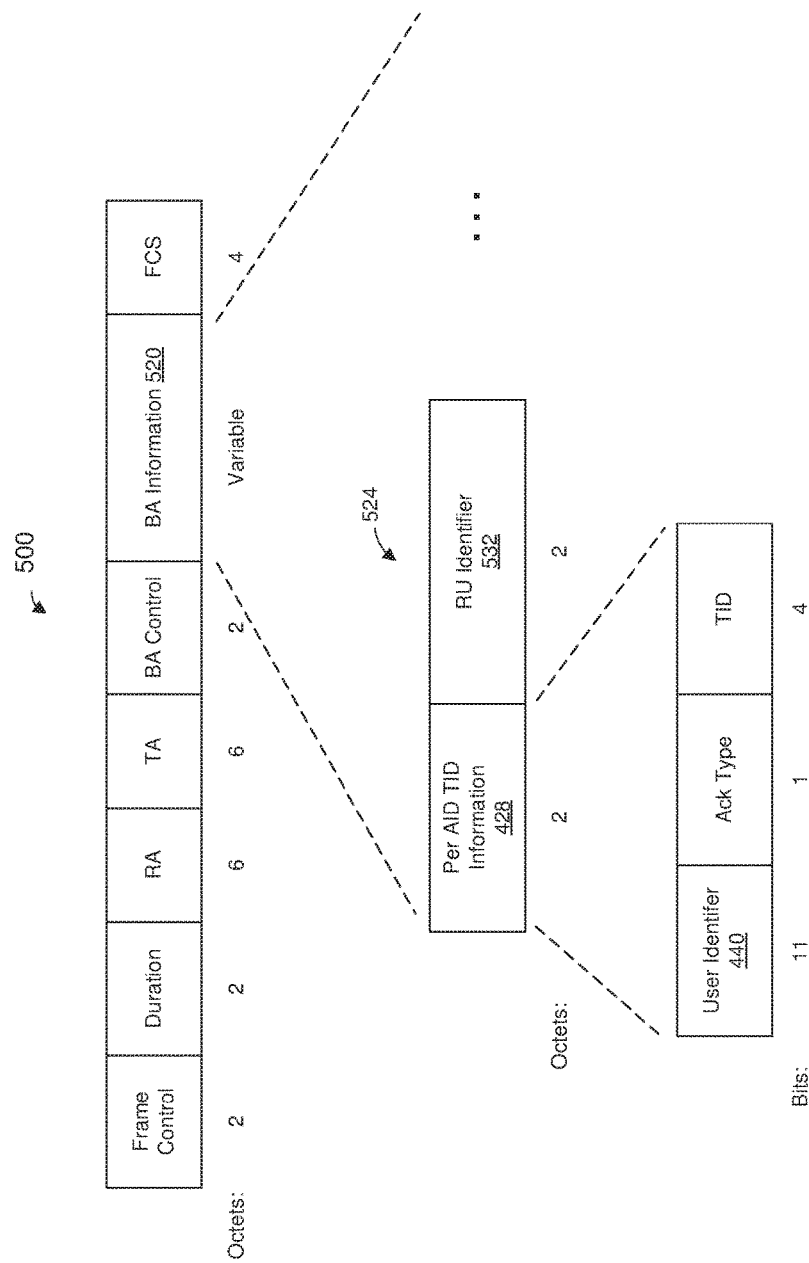
FIG. 5 is a block diagram of another example M-BA frame that may be used in an MU ranging procedure, according to another embodiment.

FIG. 5 is a diagram of another example M-BA frame 500 that is included in the acknowledgment transmission 216, according to another embodiment. As will be described in more detail below, the AP 114 includes information in the M-BA frame 500 that indicates one or more preliminary IDs assigned to one or more unassociated client stations 154. In an embodiment, the MAC processor 126 (FIG. 1) generates the M-BA frame 500 and provides the M-BA frame 500 to the PHY processor 130, which then generates a PHY data unit for transmission to a group of client stations 154. In other embodiments, another suitable communication device generates the M-BA frame 500.

FIG. 5 includes example numbers of octets and bits of various fields of the M-BA frame 500. In other embodiments, different suitable numbers of octets and bits are utilized. In other embodiments, one or more of the fields illustrated in FIG. 5 are omitted, and/or one or more additional fields are included.

FIG. 5 includes like-numbered elements of FIG. 4, and such like-numbered elements are not described in detail for purposes of brevity.

The trigger frame 500 includes a BA field 520, which includes a plurality of fields 524. Each field 524 corresponds to one of the RUs in the UL OFDMA transmission 208 of FIG. 2A. As will be discussed below, if the AP 114 does not receive, or cannot decode, one of the UL SRs 212, the AP 114 does not include a field 524 corresponding to one UT SR 212, according to an embodiment.

Each field 524 includes an RU identifier field 532 that specifies an RU in the UL OFDMA transmission 208 to which the field 524 corresponds. Referring now to FIGS. 2A and 5, upon receiving the M-BA frame 500 (transmitted by the AP 114 responsive to the UL OFDMA transmission 208), a client station 154 (e.g., the MAC processor 166) selects a field 524 that includes an RU identifier field 532 set to a value that corresponds to the frequency RU used by the client station 154 to transmit the UL SR 212. The client station 154 (e.g., the MAC processor 166) then examines the user identifier field 440 to determine the preliminary ID assigned to the client station 154. Referring again to FIGS. 2B and 3, upon receiving the trigger frame 254/300, the client station 154 (e.g., the MAC processor 166) examines fields 324 in the per-user information fields 320 to search for the preliminary ID of the client station 154. When the client station 154 (e.g., the MAC processor 166) finds a per-user information field 320 with the field 324 set to the preliminary ID of the client station 154, the client station 154 (e.g., the MAC processor 166) examines the RU allocation field 328 to determine one or more RUs that correspond to the client station 154 for the MU ranging measurement exchange (e.g., during MU transmissions 258, 266, and 274 (FIG. 2B)).

Referring now to FIGS. 2A and 5, if the AP 114 does not receive an UL SR 212, or cannot decode a received UL SR 212, corresponding to one of the RUs, the AP 114 may omit a field 524 corresponding to the one RU, in some embodiments. In other embodiments, the AP 114 includes a field 524 corresponding to the one RU. For example, the AP 114 (e.g., the MAC processor 126) includes information in the field 524 corresponding to the one RU that indicates a NACK. Additionally, the AP 114 (e.g., the MAC processor 126) does not assign a preliminary ID and does not include an assigned preliminary ID in the user identifier field 440, according to some embodiments. For example, the user identifier field 440 is omitted from the field 524 or the user identifier field 440 is set to a predetermined value associated, for example, with unknown client stations.

Figure 6:
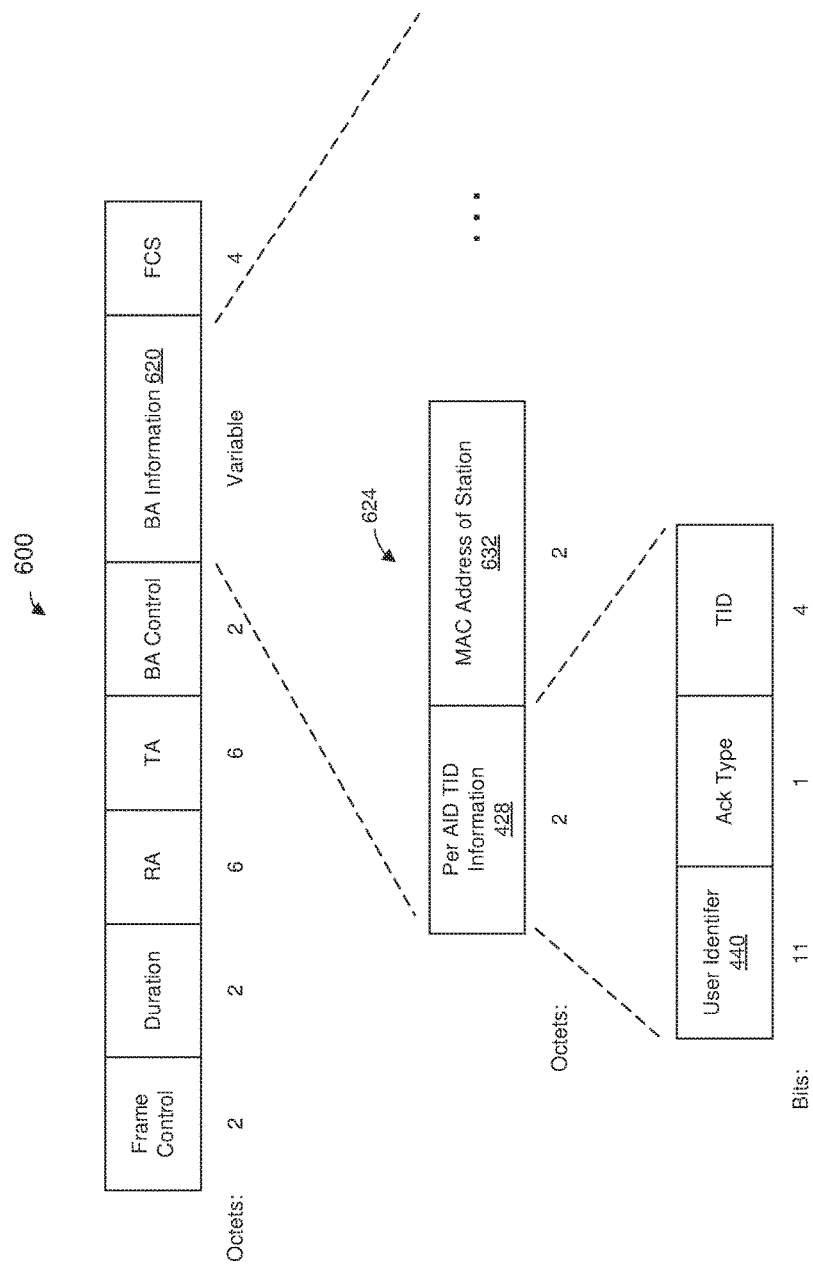
FIG. 6 is a block diagram of another example M-BA frame that may be used in an MU ranging procedure, according to another embodiment.

FIG. 6 is a diagram of another example M-BA frame 600 that is included in the acknowledgment transmission 216, according to another embodiment. As will be described in more detail below, the AP 114 includes information in the M-BA frame 600 that indicates one or more preliminary IDs assigned to one or more unassociated client stations 154. In an embodiment, the MAC processor 126 (FIG. 1) generates the M-BA frame 600 and provides the M-BA frame 600 to the PHY processor 130, which then generates a PHY data unit for transmission to a group of client stations 154. In other embodiments, another suitable communication device generates the M-BA frame 600.

FIG. 6 includes example numbers of octets and bits of various fields of the M-BA frame 600. In other embodiments, different suitable numbers of octets and bits are utilized. In other embodiments, one or more of the fields illustrated in FIG. 6 are omitted, and/or one or more additional fields are included.

FIG. 6 includes like-numbered elements of FIG. 4, and such like-numbered elements are not described in detail for purposes of brevity.

The trigger frame 600 includes a BA field 620, which includes a plurality of fields 624. Each field 624 corresponds to one of the RUs in the UL OFDMA transmission 208 of FIG. 2A. As will be discussed below, if the AP 114 does not receive, or cannot decode, one of the UL SRs 212, the AP 114 does not include a field 624 corresponding to one UL SR 212, according to an embodiment.

Each field 624 includes a client station identifier field 632 having an identifier already known to the client station 154, such as a MAC address corresponding to the client station 154. Referring to FIG. 2A, the UL SRs 212 respectively include MAC addresses of client stations 154 participating in the UL OFDMA transmission 208. Thus, the AP 114 (e.g., the MAC processor 126) determines respective MAC addresses of client stations 154 that transmitted the UL SRs 212, and then includes the MAC addresses in the fields 632.

Referring now to FIGS. 2A and 6, upon receiving the M-BA frame 600 (transmitted by the AP 114 responsive to the UL OFDMA transmission 208), a client station 154 (e.g., the MAC processor 166) selects a field 624 that includes a field 632 set to a value that corresponds to the identifier (e.g., a MAC address) corresponding to the client station 154. The client station 154 (e.g., the MAC processor 166) then examines the user identifier field 440 to determine the preliminary ID assigned to the client station 154. Referring again to FIGS. 2B and 3, upon receiving the trigger frame 254/300, the client station 154 (e.g., the MAC processor 166) examines fields 324 in the per-user information fields 320 to search for the preliminary ID of the client station 154. When the client station 154 (e.g., the MAC processor 166) finds a per-user information field 320 with the field 324 set to the preliminary ID of the client station 154, the client station 154 (e.g., the MAC processor 166) examines the RU allocation field 328 to determine one or more RUs that correspond to the client station 154 for the MU ranging measurement exchange (e.g., during MU transmissions 258, 266, and 274 (FIG. 2B)).

Referring now to FIGS. 2A and 6, if the AP 114 does not receive an UL SR 212, or cannot decode a received UL SR 212, corresponding to one of the RUs, the AP 114 may omit a field 624 corresponding to the one RU, in some embodiments. In other embodiments, the AP 114 includes a field 624 corresponding to the one RU. For example, the AP 114 (e.g., the MAC processor 126) includes information in the field 624 corresponding to the one RU that indicates a NACK. Additionally, the AP 114 (e.g., the MAC processor 126) does not assign a preliminary ID and does not include an assigned preliminary ID in the user identifier field 440, according to some embodiments. For example, the user identifier field 440 is omitted from the field 624 or the user identifier field 440 is set to a predetermined value associated, for example, with unknown client stations.

In some embodiments, AIDs and preliminary IDs are selected from a same set of possible values, and thus overlap between assigned AIDs and assigned preliminary IDs may occur, e.g., an AID of an associated station may be the same value as a preliminary ID assigned to an unassociated station. In such scenarios, the AP 114 (e.g., the MAC processor 126) selects groups of client stations 154 for MU ranging measurement exchanges (such as the MU ranging measurement exchange 250 (FIG. 2B)) such that, within each group of client stations 154, there is not an associated client station 154 with an AID of the same value of a preliminary ID assigned to an unassociated client station 154 in the group, according to some embodiments. In an embodiment, the AP 114 (e.g., the MAC processor 126) selects groups of client stations 154 for MU ranging measurement exchanges (such as the MU ranging measurement exchange 250 (FIG. 2B)) such that, within all MU ranging measurement exchanges in a single TXOP, there is not an associated client station 154 with an AID of the same value of a preliminary ID assigned to an unassociated client station 154. In an embodiment in which an AID of an associated station may be the same value as a preliminary ID assigned to an unassociated station, the AP 114 sets a field in a header of the trigger frame (e.g., in the common information field 16 (FIG. 3) to indicate whether a MU ranging exchange is for unassociated stations only; thus, an associated station will ignore trigger frames marked for unassociated stations only. In an embodiment, an unassociated station will ignore trigger frames marked for associated stations only.

In an embodiment, the AP 114 (e.g., the MAC processor 126) selects groups of client stations 154 for MU ranging measurement exchanges (such as the MU ranging measurement exchange 250 (FIG. 2B)) such that each group includes only associated client stations 154 or only unassociated client stations 154 (i.e., no group includes both an associated client station 154 and an unassociated client station 154). In an embodiment, the AP 114 (e.g., the MAC processor 126) selects groups of client stations 154 for MU ranging measurement exchanges (such as the MU ranging measurement exchange 250 (FIG. 2B)) such that all groups in a TXOP include only associated client stations 154 or only unassociated client stations 154. In one embodiment, whether the associated client stations or unassociated stations are scheduled for MU ranging is indicated in the trigger frame, e.g., in the common information field 316 or another suitable location.

In some embodiments, AIDs are selected from a first set of possible values, and preliminary IDs are selected from a second set of possible values, wherein no value in the second set is the same as any value in the first set. As merely an illustrative example, the second set includes values from 1 to 2007, and the first set includes values greater than or equal to 2008. In other embodiments, the first set and the second set include other suitable ranges of values. In such embodiments, overlap between assigned AIDs and assigned preliminary IDs cannot occur. In an embodiment, the AP 114 (e.g., the MAC processor 126) selects groups of client stations 154 for MU ranging measurement exchanges (such as the MU ranging measurement exchange 250 (FIG. 2B)) such that each group includes only associated client stations 154 or only unassociated client stations 154. In an embodiment, the AP 114 (e.g., the MAC processor 126) selects groups of client stations 154 for MU ranging measurement exchanges (such as the MU ranging measurement exchange 250 (FIG. 2B)) where a group of both associated client stations and unassociated client stations is permitted.

In some embodiments, the AP 114 (e.g., the MAC processor 126) selects preliminary IDs for client stations 154. In some embodiments, the AP 114 (e.g., the MAC processor 126) selects preliminary IDs for client stations 154 from the second set of possible values. In other embodiments, however, client stations 154 select preliminary IDs. In some embodiments, the second set of possible values is defined by a communication protocol, and the client stations 154 have a priori knowledge of the second set of possible values. In other embodiments, the AP 114 transmits the second set of possible values, or an indication of the second set of possible values (e.g., an indication of a range of values), to client stations 154, e.g., in a beacon frame, the trigger frame 204 (FIG. 2A), the trigger frame 300 (FIG. 3), or another suitable control frame, action frame, etc.

In some embodiments, the AP 114 (e.g., the MAC processor 126) selects a preliminary ID for an unassociated client station 154 such that the selected preliminary ID is not the same value as any preliminary ID currently assigned to another unassociated client station 154. In some embodiments, the AP 114 (e.g., the MAC processor 126) selects a preliminary ID for an unassociated client station 154 such that the selected preliminary ID is not the same value as any preliminary ID assigned to another unassociated client station 154 within the same group of client stations 154 participating in an MU ranging measurement exchange (such as the MU ranging measurement exchange 250 (FIG. 2B). In some embodiments, the AP 114 (e.g., the MAC processor 126) selects a preliminary ID for an unassociated client station 154 such that the selected preliminary ID is not the same value as any preliminary ID assigned to another unassociated client station 154 within any group of client stations 154 participating in any MU ranging measurement exchanges within a single TXOP. In some embodiments, the AP 111 (e.g., the MAC processor 126) selects a preliminary ID for an unassociated client station 154 such that the selected preliminary ID is not the same value as any preliminary ID assigned to another unassociated client station 154 and is not the same value as any AID of an associated station.

In some embodiments, a first client station (e.g., the MAC processor 166) randomly or pseudorandomly selects a preliminary ID for the first unassociated client station 154. If the selected preliminary ID matches a value of an already selected preliminary ID of a second unassociated client station 154, the AP 114 (e.g., the MAC processor 126) will not acknowledge of the preliminary ID selected by the first unassociated client station 154. In another embodiment, if two client stations 154 randomly or pseudo randomly select the same preliminary ID, the AP may acknowledge only one of the two unassociated client stations.

In some embodiments, the AP 114 the MAC processor 126) generates a preliminary ID for a first unassociated client station 154 using a MAC address of the first unassociated client station 154, e.g., which was obtained from the UL SR 212 (FIG. 2A). For example, the AP 114 (e.g., the MAC processor 126) applies a hash function to the MAC address of the first unassociated client station 154 to generate a preliminary ID for a first unassociated client station 154, according to an embodiment. If the generated preliminary ID matches a value of an already generated preliminary ID a second unassociated client station 154, the AP 114 (e.g., the MAC processor 126) chooses one of the first unassociated client station 154 or the second unassociated client station 154 to be included in the group for the MU ranging measurement exchange, according to an embodiment. The unchosen client station 154 is then chosen for another MU ranging measurement exchange in the same TXOP or a different TXOP. In another embodiment, if the selected preliminary ID matches a value of an already selected preliminary ID a second unassociated client station 154, the AP 114 (e.g., the MAC processor 126) randomly or pseudorandomly selects another preliminary ID for the first unassociated client station 154. In some embodiments in which preliminary IDs are generated by applying a hash function to MAC addresses of client stations 154, the AP 114 (e.g., the MAC processor 126) chooses groups of client stations 154 such that each group includes only associated client stations 154 or only unassociated client stations 154 (i.e., no group includes both an associated client station 154 and an unassociated client station 154). In some such embodiments, the AP 114 (e.g., the MAC processor 126) selects groups of client stations 154 for MU ranging measurement exchanges (such as the MU ranging measurement exchange 250 (FIG. 2B)) such that all groups in a TXOP include only associated client stations 154 or only unassociated client stations 154.

Referring again to FIGS. 2A and 2B, each unassociated client station 154 randomly selects a preliminary ID for the client station 154 and includes the selected preliminary ID in the UL SR frame 212, according to some embodiments. If the AP 114 (e.g., the MAC processor 126) determines that a preliminary ID of an unassociated client station 154 matches an AID of an associated client station 154 that participated in the UL OFDMA transmission 208, the AP 114 (e.g., the MAC processor 126) does not select the unassociated client station 154 for the group participating in the MU ranging measurement exchange 250, and includes a NACK to the unassociated client station 154 in the ACK transmission 216, according to an embodiment. If the AP 114 (e.g., the MAC processor 126) determines that a preliminary ID of a first unassociated client station 154 matches a preliminary ID of a second unassociated client station 154 that participated in the UL OFDMA transmission 208, the AP 114 (e.g., the MAC processor 126) chooses one of the first unassociated client station 154 or the second unassociated client station 154 for the group participating in the MU ranging measurement exchange 250. The AP 114 (e.g., the MAC processor 126) includes i) an ACK to the chosen unchosen unassociated client station 154, and ii) a NACK to the unchosen unassociated client station 154 in the ACK transmission 216, according to an embodiment.

Figure 7:
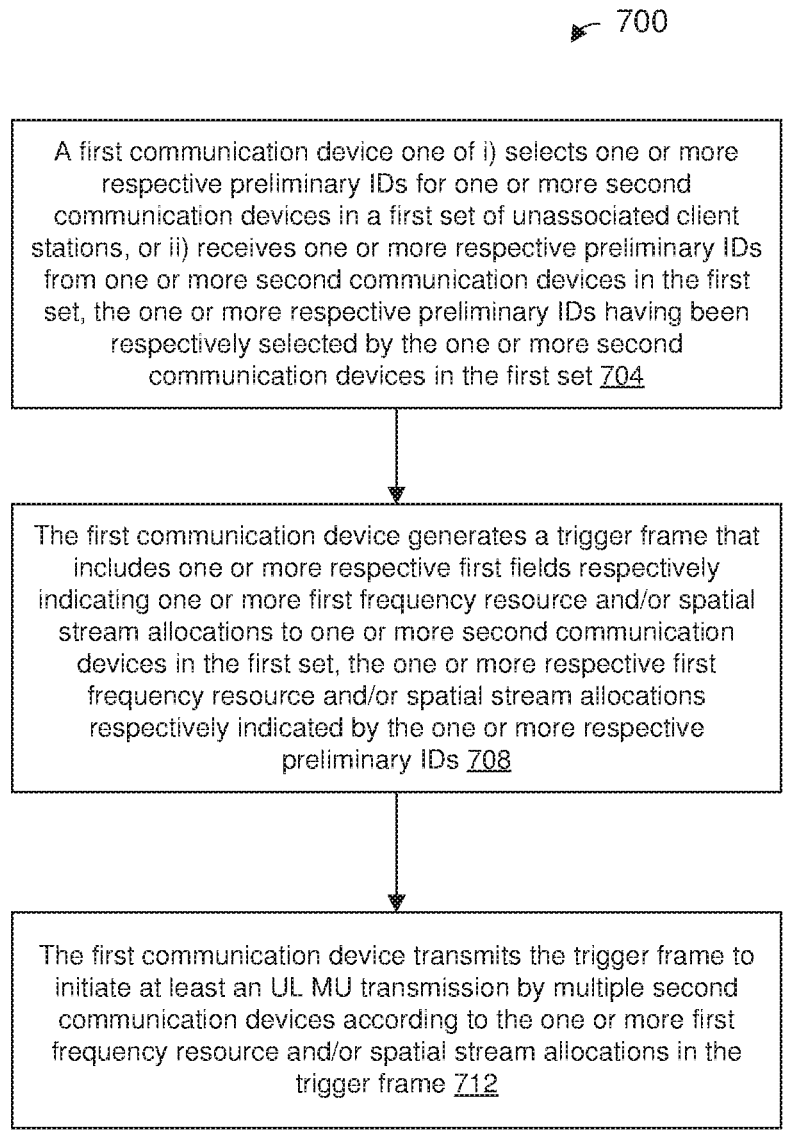
FIG. 7 is a flow diagram of an example method for MU orthogonal frequency division multiple access (OFDMA) communications in a wireless communication network, according to an embodiment.

FIG. 7 is a flow diagram of an example method 700 for MU MU communications in a wireless communication network, according to an embodiment. In the method 700, the MU MU communications are between a first communication device that manages the wireless communication network and a plurality of second communication devices, wherein a first set of one or more second communication devices is not associated with the wireless communication network and has not been assigned AIDs by the first communication device, and wherein a second set of one or more second communication devices is associated with the wireless communication network and has been assigned AIDs by the first communication device.

The method 700 is described in the context of the WLAN 110 merely for explanatory purposes. For example, in an embodiment, the first communication device in the method 700 corresponds to the AP 114 and the second communication devices in the method 700 correspond to the client stations 154. In an embodiment, the method 700 is implemented by the network interface device 122 of the AP 114. In some embodiments, however, the method 700 is implemented in another suitable wireless communication network with other suitable communication devices.

At block 704, the first communication device one of i) selects one or more respective preliminary IDs for one or more second communication devices in the first set, or ii) receives one or more respective preliminary IDs from one or more second communication devices in the first set, the one or more respective preliminary IDs having been respectively selected by the one or more second communication devices in the first set. For example, the MAC processor 126 selects one or more respective preliminary IDs for one or more unassociated client stations 154 using techniques such as described above, in an embodiment. In another embodiment, the MAC processor 126 receives one or more respective preliminary IDs from one or more unassociated client stations 154, the one or more respective preliminary IDs having been respectively selected by the one or more unassociated client stations 154 using techniques such as described above. For example, the one or more respective preliminary IDs are received by the MAC processor 126 in one or more UL frames such as the UL SR frames 212 (FIG. 2A).

At block 708, the first communication device generates a trigger frame that includes one or more respective first fields respectively indicating one or more first frequency resource allocations to one or more second communication devices in the first set, the one or more respective first frequency resource allocations respectively indicated by the one or more respective preliminary IDs. In an embodiment, the MAC processor 126 generates the trigger frame.

At block 712, the first communication device transmits the trigger frame generated at block 708 to initiate at least an UL MU transmission by multiple second communication devices according to the one or more first frequency resource allocations in the trigger frame. In an embodiment, block 712 includes the PHY processor 130 generating a PHY data unit that includes the trigger frame, upconverting the PHY data unit to one or more RF signals, and providing the one or more RF signals to one or more antennas 138.

In an embodiment, block 708 comprises generating the trigger frame to also include one or more respective second fields respectively indicating one or more second frequency resource allocations to one or more second communication devices in the second set, the one or more respective second frequency resource allocations respectively indicated by one or more respective association IDs.

In an embodiment, the trigger frame is associated with an MU ranging procedure that includes an MU ranging exchange between the first communication device and multiple second communication devices, and the MU ranging exchange includes the UL MU transmission by the multiple second communication devices.

In an embodiment, the MU ranging procedure includes i) a first stage corresponding to a service negotiation between the first communication device and the plurality of second communication devices, and ii) a second stage corresponding to the MU ranging exchange; the UL MU transmission is a first UL MU transmission; the first UL MU transmission is received during the second stage; and the method 700 further comprises the first communication device receiving a second UL MU transmission during the first stage, the second UL MU transmission including one or more transmissions respectively by one or more second communication devices in the first set using frequency resources obtained by the one or more second communication devices in the first set via contention.

In an embodiment, the first communication device (e.g., the MAC processor 126) selects one or more respective preliminary IDs for the one or more second communication devices in the first set that transmitted as part of the second UL MU transmission. In an embodiment, selecting the one or more respective preliminary IDs for the one or more second communication devices in the first set that transmitted as part of the second UL MU transmission comprises: generating, at the first communication device, a hash value using i) a hash function, and ii) a MAC address of one of the second communication devices in the first set that transmitted as part of the second UL MU transmission; and selecting the hash value as a preliminary ID of the one second communication device.

In an embodiment, the first communication device (e.g., the MAC processor 126) generates a multi-station block acknowledgment frame responsive to the second UL MU transmission, the multi-station block acknowledgment frame including information that respectively indicates to the one or more second communication devices in the first set that transmitted as part of the second UL MU transmission the one or more respective preliminary IDs selected by the first communication device for the one or more second communication devices in the first set. The communication device transmits the multi-station block acknowledgment frame to inform the one or more second communication devices in the first set that transmitted as part of the second UL MU transmission the one or more respective preliminary IDs selected by the first communication device for the one or more second communication devices in the first set. In an embodiment, transmitting the multi-station block acknowledgment frame includes the PHY processor 130 generating a PHY data unit that includes the multi-station block acknowledgment frame, upconverting the PHY data unit to one or more RF signals, and providing the one or more RF signals to one or more antennas 138.

In an embodiment, generating the multi-station block acknowledgment frame includes: generating the multi-station block acknowledgment frame to include a plurality of block acknowledgement (BA) fields arranged in an order corresponding to an order of frequency resource units utilized by different second communication devices in the second UL MU transmission, wherein a first set of one or more BA fields respectively includes the one or more respective preliminary IDs selected by the first communication device for the one or more second communication devices in the first set.

In another embodiment, generating the multi-station block acknowledgment frame includes: generating the multi-station block acknowledgment frame to include a plurality of block acknowledgement (BA) fields, wherein a first set of one or more BA fields respectively includes i) the one or more respective preliminary IDs selected by the first communication device for the one or more second communication devices in the first set, and ii) one or more respective indications of one or more frequency resource units respectively utilized by the one or more second communication devices in the first set for the second UL MU transmission.

In another embodiment, generating the multi-station block acknowledgment frame includes: generating the multi-station block acknowledgment frame to include a plurality of block acknowledgement (BA) fields, wherein a first set of one or more BA fields respectively includes i) the one or more respective preliminary IDs selected by the first communication device for the one or more second communication devices in the first set, and ii) one or more respective media access control (MAC) addresses of the one or more second communication devices in the first set.

In an embodiment, the second UL MU transmission includes one or more respective fields that respectively indicate one or more respective preliminary IDs respectively selected by the one or more second communication devices in the first set that transmitted as part of the second UL MU transmission.

Figure 8:
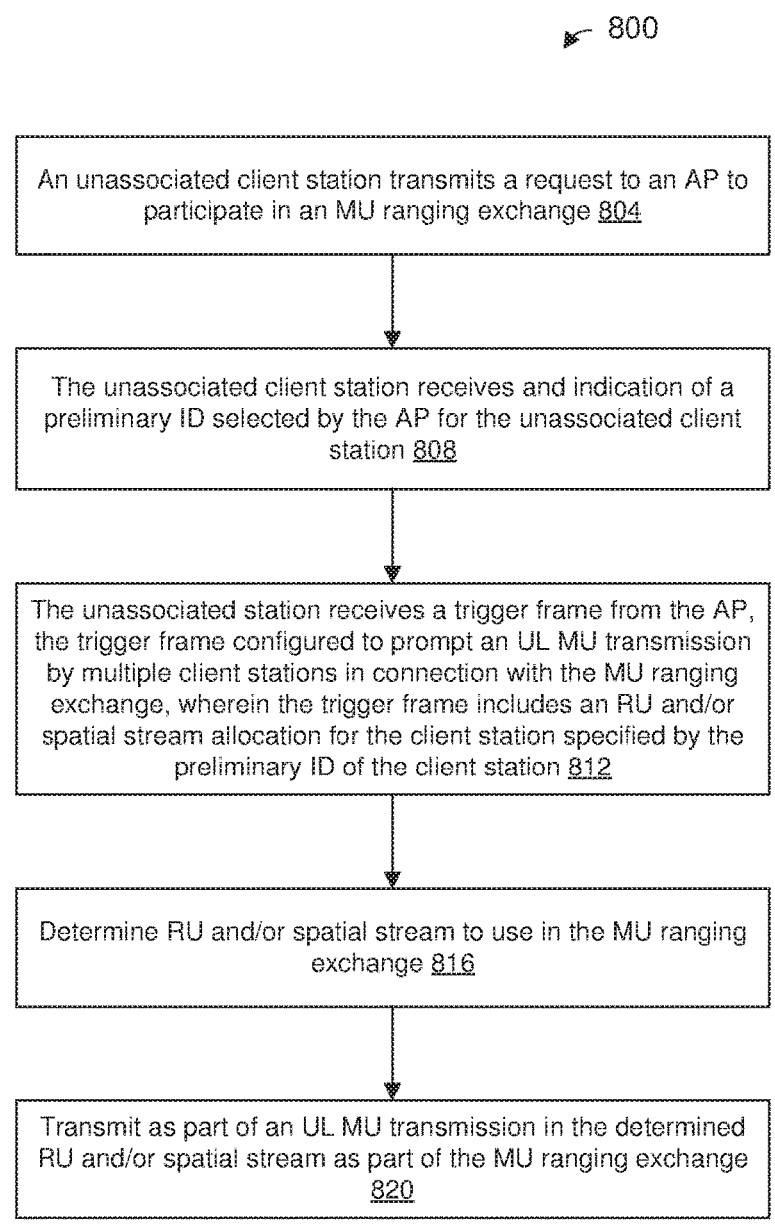
FIG. 8 is a flow diagram of an example method associated with an MU OFDMA ranging procedure in a wireless communication network, according to an embodiment.

FIG. 8 is a flow diagram of an example method 800 associated with an MU OFDMA ranging procedure in a wireless communication network, according to an embodiment. In the method 800, the MU ranging procedure involves an access point that manages a wireless network and one or more client stations, wherein at least one of the one or more client stations is not associated with the wireless network and has not been assigned an AID by the access point.

The method 800 is described in the context of the WLAN 110 merely for explanatory purposes. For example, in an embodiment, the AP in the method 800 corresponds to the AP 114 and the client station in the method 800 correspond to the client station 154-1. In an embodiment, the method 800 is implemented by the network interface device 162 of the client station 154-1. In some embodiments, however, the method 800 is implemented in another suitable wireless communication network with other suitable communication devices.

The method 800 is also described in the context of the example MU ranging procedure of FIGS. 2A and 2B merely for explanatory purposes. In some embodiments, however, the method 800 is implemented in connection with other suitable MU ranging procedures.

At block 804, an unassociated client station transmits a request to an AP to participate in an MU ranging exchange. For example, the client station 154 (e.g., the MAC processor 166) generates an UL SR frame 212 as discussed above. In an embodiment, the UL SR frame 212 is transmitted in an RU that the AP 114 denoted as available for contention-based access. In an embodiment, block 804 includes the PHY processor 170 generating a PHY data unit that includes the UL SR frame 212, upconverting the PHY data unit to one or more RF signals, and providing the one or more RF signals to one or more antennas 178.

At block 808, the unassociated client station receives from the AP an indication of a preliminary ID assigned b the AP to the client station for the MU OFDMA ranging exchange. The indication of the preliminary ID may be included in different frames from the AP, as discussed below. In an embodiment, block 808 includes the PHY processor 170 downconverting one or more RF signals, received via one or more antennas 178, corresponding to a PHY data unit that includes the frame from the AP and, extracting the frame from the PHY data unit, and providing the frame to the MAC processor 166.

At block 812, the unassociated client station receives from the AP a trigger frame, the trigger frame prompting the client station and one or more other client stations to transmit as part of an UL OFDMA transmission in connection with the MU OFDMA ranging exchange. The trigger frame includes an indication of an RU and/or spatial stream allocation for the client station specified by the preliminary ID of the client station. For example, the trigger frame has format the same as or similar to the example trigger frame 300 of FIG. 3, and the preliminary ID of the client station is included in the field 324 and an indication of the RU/spatial stream(s) allocated to the client station is included in the field 328, according to an embodiment.

In embodiments that use the trigger frame 300, the trigger frame 300 includes or omits the field 340 in different embodiments, as will be discussed below. For example, in embodiments in which the indication of the preliminary ID assigned by the AP to the client station (block 808) is included in the trigger frame of block 812, the field 340 may be included to permit the client station to identify the preliminary ID assigned to the client station, as discussed above. On the other hand, in embodiments in which the indication of the preliminary ID assigned by the AP to the client station (block 808) is not included in the trigger frame of block 812, the field 340 may be omitted from the trigger frame 300. For example, the indication of the preliminary ID assigned by the AP to the client station (block 808) may be included in an acknowledgment transmission by the AP (e.g., the acknowledgment transmission 216) corresponding to an acknowledgment of the UL SR frame 212 (block 804).

At block 816, the client station (e.g., the MAC processor 166) determines a frequency RU/spatial stream(s) to use for the MU ranging exchange using the indication of the RU/spatial stream(s) allocation for the client station received at block 812.

At block 820, the client station (e.g., the PHY processor 170) generates a PHY data unit and transmits the PHY data unit responsive to the trigger frame (block 812) as part of an UL transmission corresponding to the MU ranging exchange. Block 820 includes transmitting the PHY data unit in the frequency RU/spatial stream(s) determined at block 816.

In an embodiment, a method is associated with multi-user (MU) communications in a wireless communication network, the MU communications between a first communication device that manages the wireless communication network and a plurality of second communication devices, wherein a first set of one or more second communication devices is not associated with the wireless communication network and has not been assigned association identifiers (IDs) by the first communication device, and wherein a second set of one or more second communication devices is associated with the wireless communication network and has been assigned association IDs by the first communication device. The method includes: one of i) selecting, at the first communication device, one or more respective preliminary IDs for one or more second communication devices in the first set, or ii) receiving, at the first communication device, one or more respective preliminary IDs from one or more second communication devices in the first set, the one or more respective preliminary IDs having been respectively selected by the one or more second communication devices in the first set; generating, at the first communication device, a trigger frame, the trigger frame including one or more respective first fields respectively indicating one or more first frequency resource and/or spatial stream allocations to one or more second communication devices in the first set, the one or more respective first frequency resource and/or spatial stream allocations respectively indicated by the one or more respective preliminary IDs; and transmitting, with the communication device, the trigger frame to initiate at least an uplink (UL) MU transmission by multiple second communication devices according to the one or more first frequency resource and/or spatial stream allocations in the trigger frame.

In other embodiments, the method includes one of, or any suitable combination of two or more of, the following features.

Generating the trigger frame includes generating the trigger frame to include one or more respective second fields respectively indicating one or more second frequency resource and/or spatial stream allocations to one or more second communication devices in the second set, the one or more respective second frequency resource and/or spatial stream allocations respectively indicated by one or more respective association IDs.

The trigger frame is associated with a MU ranging procedure that includes an MU ranging exchange between the first communication device and the multiple second communication devices; and the MU ranging exchange includes the UL MU OFDMA transmission by the multiple second communication devices.

The MU ranging procedure includes i) a first stage corresponding to a service negotiation between the first communication device and the plurality of second communication devices, and ii) a second stage corresponding to the MU ranging exchange; the UL MU transmission is a first UL MU transmission; the first UL MU transmission is received during the second stage; and the method further comprises receiving, at the first communication device, a second UL MU transmission during the first stage, the second UL MU transmission including one or more transmissions respectively by one or more second communication devices in the first set using frequency resources obtained by the one or more second communication devices in the first set via contention.

The method further includes selecting, at the first communication device, one or more respective preliminary IDs for the one or more second communication devices in the first set that transmitted as part of the second UL MU transmission.

Selecting the one or more respective preliminary IDs for the one or more second communication devices in the first set that transmitted as part of the second UL MU transmission comprises: generating, at the first communication device, a hash value using i) a hash function, and ii) a media access control (MAC) address of one of the second communication devices in the first set that transmitted as part of the second UL MU transmission; and selecting the hash value as a preliminary ID of the one second communication device.

The method further comprises: generating, at the first communication device, a multi-station block acknowledgment frame responsive to the second UL MU transmission, the multi-station block acknowledgment frame including information that respectively indicates to the one or more second communication devices in the first set that transmitted as part of the second UL MU transmission the one or more respective preliminary IDs selected by the first communication device for the one or more second communication devices in the first set; and transmitting, with the first communication device, the multi-station block acknowledgment frame to inform the one or more second communication devices in the first set that transmitted as part of the second UL MU transmission the one or more respective preliminary IDs selected by the first communication device for the one or more second communication devices in the first set.

Generating the multi-station block acknowledgment frame includes: generating the multi-station block acknowledgment frame to include a plurality of block acknowledgement (BA) fields arranged in an order corresponding to an order of frequency resource units and/or spatial streams utilized by different second communication devices in the second UL MU transmission, wherein a first set of one or more BA fields respectively includes the one or more respective preliminary IDs selected by the first communication device for the one or more second communication devices in the first set.

Generating the multi-station block acknowledgment frame includes: generating the multi-station block acknowledgment frame to include a plurality of block acknowledgement (BA) fields, wherein a first set of one or more BA fields respectively includes i) the one or more respective preliminary IDs selected by the first communication device for the one or more second communication devices in the first set, and ii) one or more respective indications of one or more frequency resource units respectively utilized by the one or more second communication devices in the first set for the second UL MU transmission.

Generating the multi-station block acknowledgment frame includes: generating the multi-station block acknowledgment frame to include a plurality of block acknowledgement (BA) fields, wherein a first set of one or more BA fields respectively includes i) the one or more respective preliminary IDs selected by the first communication device for the one or more second communication devices in the first set, and ii) one or more respective media access control (MAC) addresses of the one or more second communication devices in the first set.

The second UL MU OFDMA transmission includes one or more respective fields that respectively indicate one or more respective preliminary IDs respectively selected by the one or more second communication devices in the first set that transmitted as part of the second UL MU OFDMA transmission.

In another embodiment, an apparatus is for use in a wireless communication network that includes a first communication device that manages the wireless communication network and a plurality of second communication devices, wherein a first set of one or more second communication devices is not associated with the wireless communication network and has not been assigned association identifiers (IDs) by the first communication device, and wherein a second set of one or more second communication devices is associated with the wireless communication network and has been assigned association IDs by the first communication device. The apparatus comprises a network interface device associated with the first communication device. The network interface device includes one or more integrated circuits (ICs) configured to: one of i) select one or more respective preliminary IDs for one or more second communication devices in the first set, or ii) receive one or more respective preliminary IDs from one or more second communication devices in the first set, the one or more respective preliminary IDs having been respectively selected by the one or more second communication devices in the first set. The network interface device comprises a media access control layer (MAC) processor implemented on the one or more ICs, the MAC processor configured to generate a trigger frame, the trigger frame including one or more respective first fields respectively indicating one or more first frequency resource and/or spatial stream allocations to one or more second communication devices in the first set, the one or more respective first frequency resource and/or spatial stream allocations respectively indicated by the one or more respective preliminary IDs. The network interface device further comprises a physical layer (PHY) processor implemented on the one or more ICs and coupled to the MAC processor, the PHY processor configured to generate a PHY data unit for transmission via one or more antennas of the communication device, the PHY data unit including the trigger frame, wherein transmission of the trigger frame initiates at least an uplink (UL) multi user (MU) transmission by multiple second communication devices according to the one or more first frequency resource and/or spatial stream allocations in the trigger frame.

In other embodiments, the apparatus includes one of, or any suitable combination of two or more of, the following features.

The MAC processor is configured to generate the trigger frame to include one or more respective second fields respectively indicating one or more second frequency resource and/or spatial stream allocations to one or more second communication devices in the second set, the one or more respective second frequency resource and/or spatial stream allocations respectively indicated by one or more respective association IDs.

The trigger frame is associated with a MU ranging procedure that includes an MU ranging exchange between the first communication device and the multiple second communication devices; and the MU ranging exchange includes the UL MU transmission by the multiple second communication devices.

The MU ranging procedure includes i) a first stage corresponding to a service negotiation between the first communication device and the plurality of second communication devices, and ii) a second stage corresponding to the MU ranging exchange; the UL MU transmission is a first UL MU transmission; the first UL MU transmission is received during the second stage; and the network interface is configured to receive a second UL MU transmission during the first stage, the second UL MU transmission including one or more transmissions respectively by one or more second communication devices in the first set using frequency resources obtained by the one or more second communication devices in the first set via contention.

The MAC processor is configured to: select one or more respective preliminary IDs for the one or more second communication devices in the first set that transmitted as part of the second UL MU transmission.

The MAC processor is configured to: generate a hash value using i) a hash function, and ii) a media access control (MAC) address of one of the second communication devices in the first set that transmitted as part of the second UL MU OFDMA transmission; and select the hash value as a preliminary ID of the one second communication device.

The PHY data unit is a first PHY data unit; the MAC processor is configured to generate a multi-station block acknowledgment frame responsive to the second UL MU transmission, the multi-station block acknowledgment frame including information that respectively indicates to the one or more second communication devices in the first set that transmitted as part of the second UL MU transmission the one or more respective preliminary IDs selected by the first communication device for the one or more second communication devices in the first set; and the PHY processor is configured to generate a second PHY data unit for transmission via, one or more antennas of the communication device, the second PHY data unit including the multi-station block acknowledgment frame, wherein transmission of the multi-station block acknowledgment frame informs the one or more second communication devices in the first set that transmitted as part of the second UL MU transmission the one or more respective preliminary IDs selected by the first communication device for the one or more second communication devices in the first set.

The MAC processor is configured to: generate the multi-station block acknowledgment frame to include a plurality of block acknowledgement (BA) fields arranged in an order corresponding to an order of frequency resource units utilized by different second communication devices in the second UL MU transmission, wherein a first set of one or more BA fields respectively includes the one or more respective preliminary IDs selected by the first communication device for the one or more second communication devices in the first set.

The MAC processor is configured to: generate the multi-station block acknowledgment frame to include a plurality of block acknowledgement (BA) fields, wherein a first set of one or more BA fields respectively includes i) the one or more respective preliminary IDs selected by the first communication device for the one or more second communication devices in the first set, and ii) one or more respective indications of one or more frequency resource units respectively utilized by the one or more second communication devices in the first set for the second UL MU transmission.

The MAC processor is configured to: generate the multi-station block acknowledgment frame to include a plurality of block acknowledgement (BA) fields, wherein a first set of one or more BA fields respectively includes i) the one or more respective preliminary IDs selected by the first communication device for the one or more second communication devices in the first set, and ii) one or more respective media access control (MAC) addresses of the one or more second communication devices in the first set.

The second UL MU OFDMA transmission includes one or more respective fields that respectively indicate one or more respective preliminary IDs respectively selected by the one or more second communication devices in the first set that transmitted as part of the second UL MU OFDMA transmission.

In still another embodiment, an apparatus is for use in a wireless communication network that includes a first communication device that manages the wireless communication network and a plurality of second communication devices, wherein a first set of one or more second communication devices is not associated with the wireless communication network and has not been assigned association identifiers (IDs) by the first communication device, and wherein a second set of one or more second communication devices is associated with the wireless communication network and has been assigned association IDs by the first communication device. The apparatus comprises a network interface device associated with the first communication device. The network interface device includes one or more integrated circuits (ICs) configured to: one of i) select one or more respective preliminary IDs for one or more second communication devices in the first set, or ii) receive one or more respective preliminary IDs from one or more second communication devices in the first set, the one or more respective preliminary IDs having been respectively selected by the one or more second communication devices in the first set; generate a trigger frame, the trigger frame including one or more respective first fields respectively indicating one or more first frequency resource and/or spatial stream allocations to one or more second communication devices in the first set, the one or more respective first frequency resource and/or spatial stream allocations respectively indicated by the one or more respective preliminary IDs; and generate a PHY data unit for transmission via one or more antennas of the communication device, the PHY data unit including the trigger frame, wherein transmission of the trigger frame initiates at least an uplink (UL) multi user (MU) transmission by multiple second communication devices according to the one or more first frequency resource and/or spatial stream allocations in the trigger frame.

In other embodiments, the apparatus includes one of, or any suitable combination of two or more of, the following features.

The one or more ICs are configured to generate the trigger frame to include one or more respective second fields respectively indicating one or more second frequency resource and/or spatial stream allocations to one or more second communication devices in the second set, the one or more respective second frequency resource and/or spatial stream allocations respectively indicated by one or more respective association IDs.

The trigger frame is associated with a MU ranging procedure that includes an MU ranging exchange between the first communication device and the multiple second communication devices; and the MU ranging exchange includes the UL MU transmission by the multiple second communication devices.

The MU ranging procedure includes i) a first stage corresponding to a service negotiation between the first communication device and the plurality of second communication devices, and ii) a second stage corresponding to the MU ranging exchange; the UL MU transmission is a first UL MU transmission; the first UL MU transmission is received during the second stage; and the network interface is configured to receive a second. UL MU transmission during the first stage, the second UL MU transmission including one or more transmissions respectively by one or more second communication devices in the first set using frequency resources obtained by the one or more second communication devices in the first set via contention.

The one or more ICs are configured to: select one or more respective preliminary IDs for the one or more second communication devices in the first set that transmitted as part of the second UL MU transmission.

The one or more ICs are configured to: generate a hash value using i) a hash function, and ii) a media access control (MAC) address of one of the second communication devices in the first set that transmitted as part of the second UL MU OFDMA transmission; and select the hash value as a preliminary ID of the one second communication device.

The PHY data unit is a first PHY data unit; the one or more ICs are configured to generate a multi-station block acknowledgment frame responsive to the second UL MU transmission, the multi-station block acknowledgment frame including information that respectively indicates to the one or more second communication devices in the first set that transmitted as part of the second UL MU transmission the one or more respective preliminary IDs selected by the first communication device for the one or more second communication devices in the first set; and the one or more ICs are configured to generate a second PHY data unit for transmission via one or more antennas of the communication device, the second PHY data unit including the multi-station block acknowledgment frame, wherein transmission of the multi-station block acknowledgment frame informs the one or more second communication devices in the first set that transmitted as part of the second UL MU transmission the one or more respective preliminary IDs selected by the first communication device for the one or more second communication devices in the first set.

The one or more ICs are configured to: generate the multi-station block acknowledgment frame to include a plurality of block acknowledgement (BA) fields arranged in an order corresponding to an order of frequency resource units utilized by different second communication devices in the second UL MU transmission, wherein a first set of one or more BA fields respectively includes the one or more respective preliminary IDs selected by the first communication device for the one or more second communication devices in the first set.

The one or more ICs are configured to: generate the multi-station block acknowledgment frame to include a plurality of block acknowledgement (BA) fields, wherein a first set of one or more BA fields respectively includes i) the one or more respective preliminary IDs selected by the first communication device for the one or more second communication devices in the first set, and ii) one or more respective indications of one or more frequency resource units respectively utilized by the one or more second communication devices in the first set for the second UL MU transmission.

The one or more ICs are configured to: generate the multi-station block acknowledgment frame to include a plurality of block acknowledgement (BA) fields, wherein a first set of one or more BA fields respectively includes i) the one or more respective preliminary IDs selected by the first communication device for the one or more second communication devices in the first set, and ii) one or more respective media. access control (MAC) addresses of the one or more second communication devices in the first set.

The second UL MU OFDMA transmission includes one or more respective fields that respectively indicate one or more respective preliminary IDs respectively selected by the one or more second communication devices in the first set that transmitted as part of the second UL MU OFDMA transmission.

At least sonic of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for multi-user (MU) communications in a wireless communication network, the MU communications between a first communication device that manages the wireless communication network and a plurality of second communication devices, wherein a first set of one or more second communication devices is not associated with the wireless communication network and has not been assigned association identifiers (IDs) by the first communication device, and wherein a second set of one or more second communication devices is associated with the wireless communication network and has been assigned association IDs by the first communication device, the method comprising:
selecting, at the first communication device, one or more respective preliminary IDs for one or more second communication devices in the first set;
generating, at the first communication device, a trigger frame, the trigger frame including
i) one or more respective first fields respectively indicating one or more first frequency resource and/or spatial stream allocations to one or more second communication devices in the first set, the one or more respective first frequency resource and/or spatial stream allocations respectively indicated by the one or more respective preliminary IDs, and ii) one or more respective second fields respectively indicating the one or more preliminary IDs selected for the one or more second communication devices in the first set, wherein the trigger frame further indicates respective one or more medium access control (MAC) addresses of the one or more second communication devices in the first set; and transmitting, with the communication device, the trigger frame to initiate at least an uplink (UL) MU transmission by multiple second communication devices according to the one or more first frequency resource and/or spatial stream allocations in the trigger frame.

2. The method of claim 1, wherein generating the trigger frame includes generating the trigger frame to include one or more respective third fields respectively indicating one or more second frequency resource and/or spatial stream allocations to one or more second communication devices in the second set, the one or more respective second frequency resource and/or spatial stream allocations respectively indicated by one or more respective association IDs.

3. The method of claim 1, wherein:
the trigger frame is associated with a MU ranging procedure that includes an MU ranging exchange between the first communication device and the multiple second communication devices; and
the MU ranging exchange includes the UL MU OFDMA transmission by the multiple second communication devices.

4. The method of claim 3, wherein:
the MU ranging procedure includes i) a first stage corresponding to a service negotiation between the first communication device and the plurality of second communication devices, and ii) a second stage corresponding to the MU ranging exchange;
the UL MU transmission is a first UL MU transmission;
the first UL MU transmission is received during the second stage; and
the method further comprises receiving, at the first communication device, a second UL MU transmission during the first stage, the second UL MU transmission including one or more transmissions respectively by one or more second communication devices in the first set using frequency resources obtained by the one or more second communication devices in the first set via contention.

5. The method of claim 4, further comprising:
selecting, at the first communication device, the one or more respective preliminary IDs for the one or more second communication devices in the first set that transmitted as part of the second UL MU transmission.

6. The method of claim 5, wherein selecting the one or more respective preliminary IDs for the one or more second communication devices in the first set that transmitted as part of the second UL MU transmission comprises:
generating, at the first communication device, a hash value using i) a hash function, and ii) a MAC address of one of the second communication devices in the first set that transmitted as part of the second UL MU transmission; and
selecting the hash value as a preliminary ID of the one second communication device.

7. An apparatus for use in a wireless communication network that includes a first communication device that manages the wireless communication network and a plurality of second communication devices, wherein a first set of one or more second communication devices is not associated with the wireless communication network and has not been assigned association identifiers (IDs) by the first communication device, and wherein a second set of one or more second communication devices is associated with the wireless communication network and has been assigned association IDs by the first communication device, the apparatus comprising:

a network interface device associated with the first communication device, wherein the network interface device includes one or more integrated circuits (ICs) configured to:
select one or more respective preliminary IDs for one or more second communication devices in the first set;

wherein the network interface device comprises a media access control layer (MAC) processor implemented on the one or more ICs, the MAC processor configured to generate a trigger frame, the trigger frame including
i) one or more respective first fields respectively indicating one or more first frequency resource and/or spatial stream allocations to one or more second communication devices in the first set, the one or more respective first frequency resource and/or spatial stream allocations respectively indicated by the one or more respective preliminary IDs, and
ii) one or more respective second fields respectively indicating the one or more preliminary IDs selected for the one or more second communication devices in the first set, wherein the trigger frame further indicates respective one or more medium access control (MAC) addresses of the one or more second communication devices in the first set; and wherein the network interface device further comprises a physical layer (PHY) processor implemented on the one or more ICs and coupled to the MAC processor, the PHY processor configured to generate a PHY data unit for transmission via one or more antennas of the communication device, the PHY data unit including the trigger frame, wherein transmission of the trigger frame initiates at least an uplink (UL) multi user (MU) transmission by multiple second communication devices according to the one or more first frequency resource and/or spatial stream allocations in the trigger frame.

8. The apparatus of claim 7, wherein the MAC processor is configured to generate the trigger frame to include one or more respective third fields respectively indicating one or more second frequency resource and/or spatial stream allocations to one or more second communication devices in the second set, the one or more respective second frequency resource and/or spatial stream allocations respectively indicated by one or more respective association IDs.

9. The apparatus of claim 7, wherein:
the trigger frame is associated with a MU ranging procedure that includes an MU ranging exchange between the first communication device and the multiple second communication devices; and
the MU ranging exchange includes the UL MU transmission by the multiple second communication devices.

10. The apparatus of claim 9, wherein:
the MU ranging procedure includes i) a first stage corresponding to a service negotiation between the first communication device and the plurality of second communication devices, and ii) a second stage corresponding to the MU ranging exchange;

the UL MU transmission is a first UL MU transmission;

the first UL MU transmission is received during the second stage; and the network interface is configured to receive a second UL MU transmission during the first stage, the second UL MU transmission including one or more transmissions respectively by one or more second communication devices in the first set using frequency resources obtained by the one or more second communication devices in the first set via contention.

11. The apparatus of claim 10, wherein the MAC processor is configured to:

select the one or more respective preliminary IDs for the one or more second communication devices in the first set that transmitted as part of the second UL MU transmission.

12. The apparatus of claim 11, wherein the MAC processor is configured to:

generate a hash value using i) a hash function, and ii) a MAC address of one of the second communication devices in the first set that transmitted as part of the second UL MU OFDMA transmission; and select the hash value as a preliminary ID of the one second communication device.

* * * * *